United States Patent
Jahnke et al.

(10) Patent No.: US 7,961,575 B2
(45) Date of Patent: Jun. 14, 2011

(54) AUTOMATIC DTS CD VERSUS CD-DA DETECTION WITHIN A FILE SYSTEM-BASED DEVICE

(75) Inventors: Steven R. Jahnke, Allen, TX (US); Takeshi Kasuya, Nerima-ku (JP); Ryuichi Shiraishi, Saitama (JP)

(73) Assignee: Texas Instruments Incorporated, Dallas, TX (US)

( * ) Notice: Subject to any disclaimer, the term of this patent is extended or adjusted under 35 U.S.C. 154(b) by 256 days.

(21) Appl. No.: 12/361,651

(22) Filed: Jan. 29, 2009

(65) Prior Publication Data

US 2010/0188947 A1    Jul. 29, 2010

(51) Int. Cl.
G11B 7/00 (2006.01)
(52) U.S. Cl. .......... 369/53.2; 369/44.27; 369/47.55; 369/53.37; 369/59.14; 369/59.23; 369/59.26; 369/59.25; 700/94; 370/476

(58) Field of Classification Search .......... 369/53.2, 369/174, 44.27, 53.45, 147.55, 47.55, 53.37, 369/59.14, 59.23, 59.26, 59.25; 700/94; 370/476

See application file for complete search history.

(56) References Cited

U.S. PATENT DOCUMENTS

| 4,010,422 A * | 3/1977 | Wouda ............ 375/243 |
| 4,692,816 A * | 9/1987 | Sugiyama et al. ...... 386/239 |
| 7,236,836 B1 * | 6/2007 | Tanaka et al. ........ 700/94 |
| 2007/0079241 A1 * | 4/2007 | Wang et al. .......... 715/727 |

* cited by examiner

*Primary Examiner* — Wayne R Young
*Assistant Examiner* — Linh T Nguyen
(74) *Attorney, Agent, or Firm* — Robert D. Marshall, Jr.; W. James Brady; Frederick J. Telecky, Jr.

(57) ABSTRACT

A method of detection is described to be used in file system-based player devices to determine the type of compact disk that has been inserted into a player. The method automatically distinguishes between the DTS-CD format and standard audio CDs. The method allows the operating system or CPU software to take appropriate action to decode and playback the audio stream once the a decision between standard audio CD or DTS-CD is made.

2 Claims, 1 Drawing Sheet

AUTOMATIC DTS CD VERSUS CD-DA DETECTION WITHIN A FILE SYSTEM-BASED DEVICE

TECHNICAL FIELD OF THE INVENTION

The technical field of this invention is detection of the type of CD inserted into a CD drive.

BACKGROUND OF THE INVENTION

It is desirable to detect whether data stored on a CD is stored in DTS-CDs format or is a normal audio CD. FIG. 1 illustrates the frame data structure of a DTS-CD. As shown in FIG. 1 DTS-CD data is divided into blocks of 4096 bytes. FIG. 1 illustrates two blocks. Each such block includes 4 bytes of synchronization data (101, 111), 4 bytes of header data *102, 112) and 4092 bytes of audio data (103, 113).

Currently, if a DTS-CD is inserted into a computer or other embedded system that contains an operating system (OS) or file system, such as used in an automotive infotainment system, white noise is played back due to the nature of DTS-CDs. The DTS-CD format was created by DTS Inc. (formally knows as Digital Theater Systems, Inc.) for DTS audio data to be readable by existing CD players. Thus a DTS-CD is constructed to make it appear that a standard CD was inserted into the CD player. Thus a CD ROM (read only memory) drive reads a DTS-CD as an audio CD and not a data CD. This information is returned to the OS or file system of the device containing the CD ROM drive. The system then assumes the inserted CD is in audio CD format. However, the bitstream on DTS-CDs is not the standard pulse code modulation (PCM) data of standard audio CDs. It is a compressed audio stream that must be decoded with a DTS decoder. Thus it is desirable to automatically detect if a disk inserted into a CD-ROM drive or DVD-ROM drive is a normal audio CD or a DTS-CD without any user interaction. It is further desirable to automatically call a DTS decoder after detecting a DTS-CD.

SUMMARY OF THE INVENTION

The present invention is a method of detection enabling a file system-based player devices to determine the type of compact disk inserted into the player. The method automatically distinguishes between standard compressed audio stream formats (such as MP3, WMA, etc.) in a data CD format and standard audio and DTS-CDs that are in audio CD format. This method allows the device to respond appropriately to the detected disk format.

BRIEF DESCRIPTION OF THE DRAWINGS

These and other aspects of this invention are illustrated in the drawings, in which.

DETAILED DESCRIPTION OF PREFERRED EMBODIMENTS

If a compact disk inserted into a CD-ROM or DVD-ROM player contains standard compressed audio formats, it will be detected as a data CD by the player. The player will pass data to the player file system for corresponding action. With the file system informed that the disk is a data CD, standard (Prior Art) file handling operations occur. This results in the appropriate compressed audio decoder being called. If an audio CD is inserted, the CD/DVD-ROM will detect it as an audio CD and pass that information to the file system. From the file system viewpoint, it is no longer acceptable to simply assume the CD inserted is an audio CD. Additional processing must be performed to determine if the CD is an audio CD or a DTS-CD. If CD/DVDROM determines the disk to be a DTS-CD, further processing is required to decode the data on the disk.

The method required to perform the audio CD versus DTS-CD determination in a file system based CPU system is different than is commonly used in the home audio-video receiver (AVR) digital decoders. Existing AVR systems take in the audio data via a bitstream over a common protocol (such as S/PDIF or IEC-60985) that is generated from an external player, such as a CD or DVD player. Due to the nature of the protocol, there is no disk identifying information passed from the CD drive mechanism to the AVRs host processor is required to play either an audio CD or data CD. Rather, the CD or DVD players Digital Interface Transmitter (DIT) subsystem will precondition the bitstream and embed into the bitstream header the type of data to be sent (either PCM or compressed audio, such as AC3). This bitstream is then received by the AVRs Digital Interface Receiver (DIR) subsystem, which passes the data to the AVRs host CPU or digital signal processor (DSP) for eventual decoding. In such a system, there is no direct interaction between the CD/DVD drive mechanism and the host CPU operating system or file system. Thus the host CPU does not need to determine the type of data to be read off the CD/DVD drive mechanism (audio CD or data CD), and can autodetect without user intervention the difference between DTS-CDs and audio CDs by bitstream manipulation.

In a self-contained audio system containing both the audio decode/playback mechanism and CD/DVD drive mechanism, to determine the difference between DTS-CDs and audio CDs without user intervention, this prior art method used in separate CD/DVD player and AVR systems is not applicable as there is no DIT/DIR interface for the bitstream to pass. This invention allows DTS-CDs and audio CDs to be played back without requiring user interaction in such systems.

Figure 1:
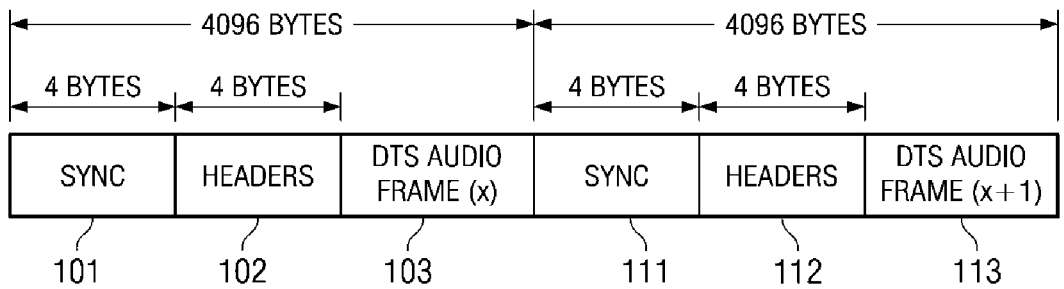
FIG. 1 illustrates the frame data structure of a DTS-CD.
Figure 2:
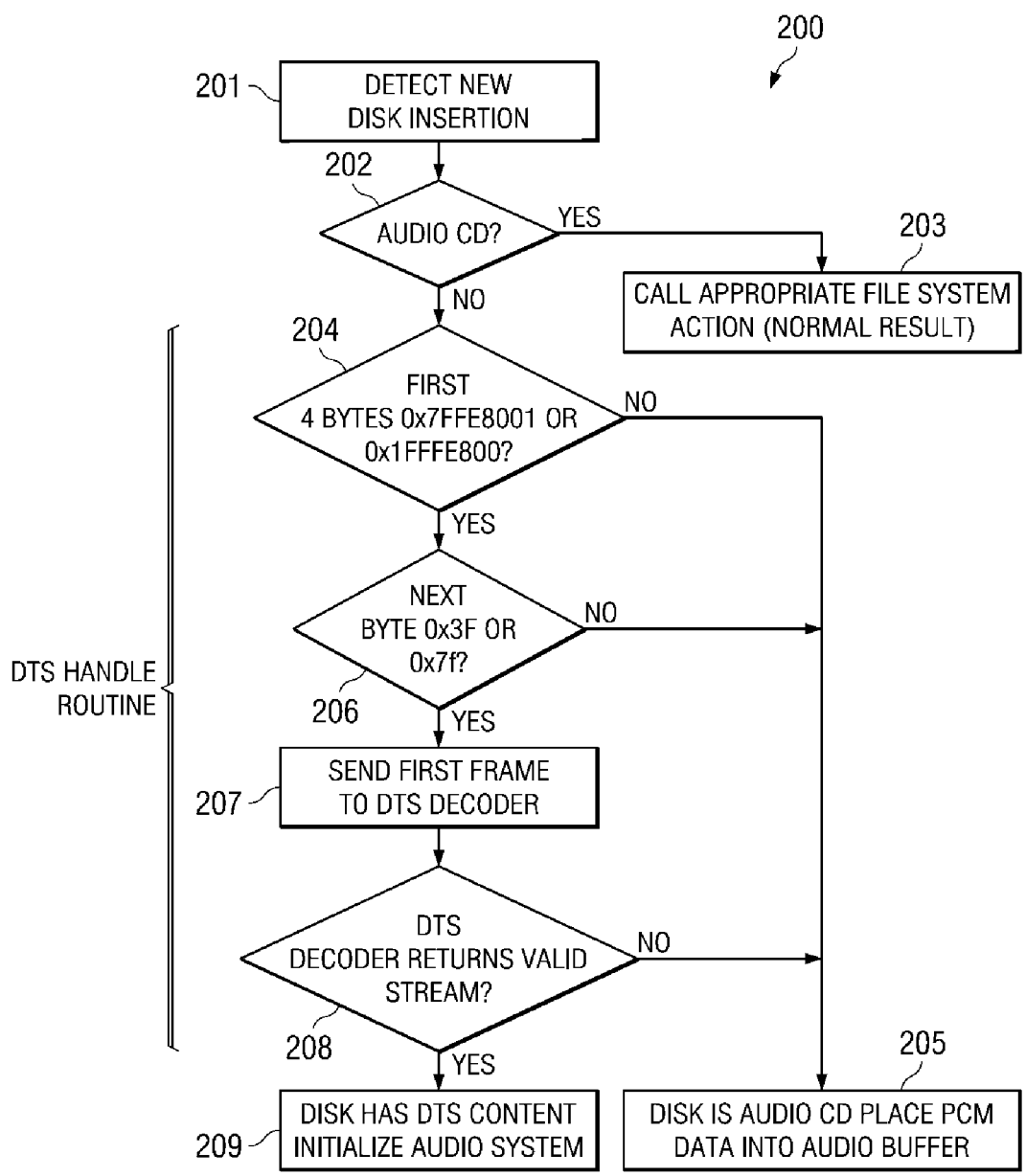
FIG. 2 illustrates a flow chart of the automatic DTS-CD versus CD-DA detection system of this invention.

FIG. 2 illustrates flow diagram 200 of the automatic DTS-CD versus CD-DA detection of this invention, which operates within file system-based devices. The steps of this method are as follows. Step 201 detects insertion of a new disk into a CD/DVD ROM player. In step 202 the file system reads the disk to determine content. This content is determined to be either a data CD or an audio CD. If the inserted disk is an audio CD (Yes at step 202), then in step 203 the file system assumes the data on the disk is standard audio PCM data. Thus the file system calls the CD reader for normal operation and the appropriate software audio buffers. If the inserted disk is not an audio CD, such as a MP3 or WMA content on a FAT32 file system, (No at step 202), then the file system must call the appropriate decoder for the music standard employed such as Windows Media Player.

Steps 204 through 209 are performed next as a software routine that is responsible for passing the data from the CD to an audio track buffer. Step 204 checks the first four bytes of the data section to determine if these bytes are 0x7FFE8001 or 0x1FFFE800 (0x signifies a hexadecimal number). These two constants in the initial SYNC section 101 of DTS data marks the audio data in DTS format as 16-bit data or 14-bit data, respectively. If the first four bytes are not 0x7FFE8001 or 0x1FFFE800 (No at step 204), then the disk is a standard audio CD. Step 205 passes the PCM data read from the disk into the audio buffer. If the first four bytes are 0x7FFE8001 or 0x1FFFE800 (No at step 204), then step 206 checks if the next byte of data section is 0x3F or 0x7F. If the next byte of data is not 0x3F or 0x7F (No at step 206), then the disk is a standard audio CD. Flow advances to step 205 which passes the PCM data read from the disk into the audio buffer.

If the next byte of data is 0x3F or 0x7F (Yes at step 206), then step 207 sends the first frame of data to the DTS decoder. Step 208 determines if the DTS decoder recognized a valid input stream. The DTS decoder detects this sync stream and returns a valid DTS stream status if the first frame data send in step 207 is valid. If the DTS decoder returns an invalid DTS stream indication (No in step 208), the DTS Handle Routine assumes the disk is a standard audio CD. Flow advances to step 205 which passes the PCM data read from the disk into the audio buffer.

If the DTS decoder returns a valid DTS stream indication (Yes in step 208), the DTS Handle Routine assumes the data on the disk is DTS data. Step 209 marks the track as a DTS-CD track. Then instead of simply passing the data to the audio channel buffer, initiate DTS decoder operations. This includes calling the DTS decoder with any setups required, just like the case where the audio data is coming from a DVD configured to output DTS. The track will then play correctly instead of generating white noise. DTS Decoder operation proceeds processing all tracks on the disk as DTS tracks.

Current file system-based products simply do not handle DTS-CDs. Without user interaction these prior art products output white noise, even if a DTS decoder exists in the system. In these prior art systems if DTS-CDs are supported, the DTS decoder must be called via a DVD player. This requires user interaction to tell the player that the content has a DTS audio stream. This creates a burden to the user.

In the home AVR market, the bitstream must be autodetected. This is generally done by decoding the IEC header in the bitstream. However, the prior art cannot do this if the stream exists on a disk being read via a CD/DVD-ROM which reports the type of disk (data or audio) to the file system.

In this invention, the end user can listen to DTS-CDs by simply inserting them into the player without making any configuration changes. The DTS-CD will simply playback as if it were a normal audio CD. The user simply inserts the disk and the software will automatically determine if the disk is a normal audio-CD or DTS-CD.

What is claimed is:

1. A method of compact disk (CD) data type determination comprising the steps of:
    detecting CD insertion;
    determining if an inserted CD is a music CD or a data CD;
    if said inserted CD is a music CD, then
        assuming data on said music CD is standard audio pulse code modulation (PCM) data, and
        calling a CD reader for standard audio PCM data;
    determining if a first 4 bytes of data on said inserted CD are hexadecimal "7FFE8001" or "1FFFE800";
    if said first 4 bytes of data are neither hexadecimal "7FFE8001" nor "1FFFE800", then
        assuming data on said inserted CD is standard audio PCM data, and
        calling a CD reader for standard audio PCM data;
    if said first 4 bytes of data on said inserted CD are either hexadecimal "7FFE8001" or "1FFFE800", then determining if the next byte of data is hexadecimal "3F" or "7F";
    if said next byte of data is neither hexadecimal "3F" nor "7F", then
        assuming data on said inserted CD is standard audio PCM data, and
        calling a CD reader for standard audio PCM data;
    if said next byte of data is either hexadecimal "3F" or "7F", then sending data on said inserted CD to a Digital Theater Systems (DTS) decoder for playback.

2. The method of claim 1, wherein:
    said step of sending data on said inserted CD to a DTS decoder for playback includes
        sending a first frame of data to said DTS decoder,
        determining if said DTS decoder returns a valid DTS stream indication for said first frame of data,
        if said DTS decoder does not return a valid DTS stream indication for said first frame of data, then
            assuming data on said inserted CD is standard audio PCM data, and
            calling a CD reader for standard audio PCM data, and
        if said DTS decoder returns a valid DTS stream indication for said first frame of data, then
            assuming data on said inserted CD is DTS-CDs format data, and
            calling a DTS-CD decoder to initiate DTS decoder operations.

* * * * *